United States Patent

Kaplinsky

(10) Patent No.: US 7,599,550 B1
(45) Date of Patent: Oct. 6, 2009

(54) METHOD FOR ACCURATE REAL-TIME COMPENSATION FOR CHANGING ILLUMINATION SPECTRA IN DIGITAL VIDEO CAMERAS

(75) Inventor: Michael Kaplinsky, Sierra Madre, CA (US)

(73) Assignee: Arecont Vision LLC, Altadena, CA (US)

( * ) Notice: Subject to any disclaimer, the term of this patent is extended or adjusted under 35 U.S.C. 154(b) by 926 days.

(21) Appl. No.: 10/994,644

(22) Filed: Nov. 22, 2004

Related U.S. Application Data

(60) Provisional application No. 60/524,490, filed on Nov. 21, 2003, provisional application No. 60/524,449, filed on Nov. 21, 2003, provisional application No. 60/524,448, filed on Nov. 21, 2003, provisional application No. 60/524,488, filed on Nov. 21, 2003.

(51) Int. Cl.
  *G06K 9/00* (2006.01)
(52) U.S. Cl. .................. 382/162; 382/167; 382/254; 382/274; 348/223.1; 358/516
(58) Field of Classification Search .............. 382/162, 382/164, 165, 167
  See application file for complete search history.

(56) References Cited

U.S. PATENT DOCUMENTS

| | | | | |
|---|---|---|---|---|
| 4,739,392 | A * | 4/1988 | Ueda et al. ............... | 348/225.1 |
| 5,187,570 | A * | 2/1993 | Hibi et al. .................. | 358/520 |
| 5,555,022 | A * | 9/1996 | Haruki et al. ............ | 348/223.1 |
| 7,190,394 | B2 * | 3/2007 | Kaplinsky et al. ........ | 348/223.1 |
| 7,218,344 | B2 * | 5/2007 | Cooper ..................... | 348/223.1 |
| 2004/0057615 | A1 * | 3/2004 | Johannesson et al. ....... | 382/167 |
| 2004/0119995 | A1 * | 6/2004 | Nishi et al. ................. | 358/1.9 |
| 2004/0120575 | A1 * | 6/2004 | Cheng ........................ | 382/167 |

* cited by examiner

*Primary Examiner*—Matthew C Bella
*Assistant Examiner*—Eric Rush
(74) *Attorney, Agent, or Firm*—Christie, Parker & Hale, LLP

(57) ABSTRACT

A method for determining a correction for a spectra of scene illumination based on analysis of color content of a video image, in which average image colors are obtained by considering only those image pixels that have significantly different color from any of its neighboring pixels resulting in selection of only those pixels that lay on the boundaries of monochrome image segments, while avoiding their inner areas. Therefore, the white balance method is not only tolerant to the presence of large non-gray monochrome areas in the image, but also avoids the image areas that have small chrominance values and appear to be gray due to specific illumination spectra, while not actually corresponding to the grey areas of the scene.

12 Claims, 2 Drawing Sheets

Flow-Chart of the Method Disclosed in the Present Invention

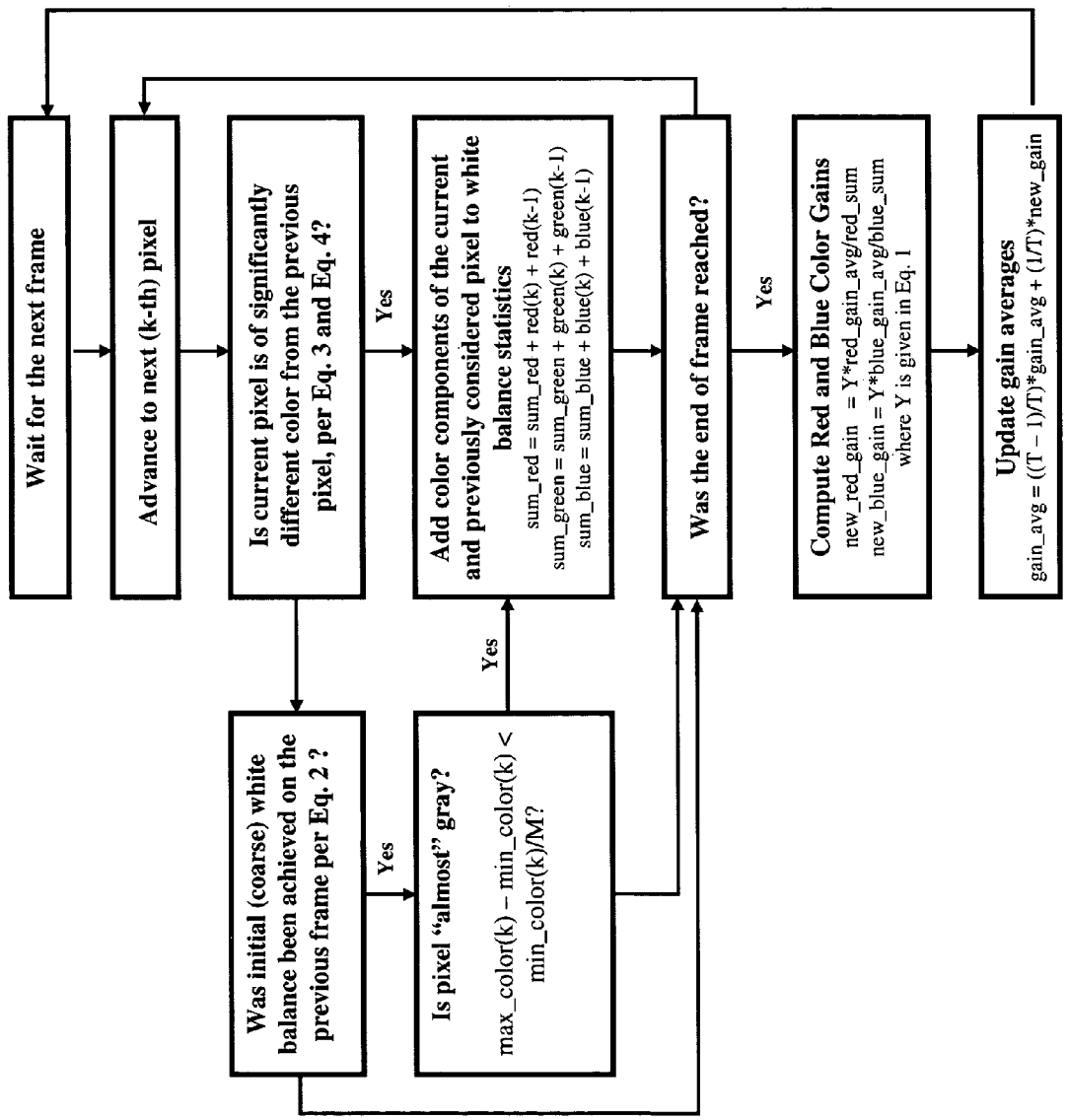
Figure 1. Flow-Chart of the Method Disclosed in the Present Invention

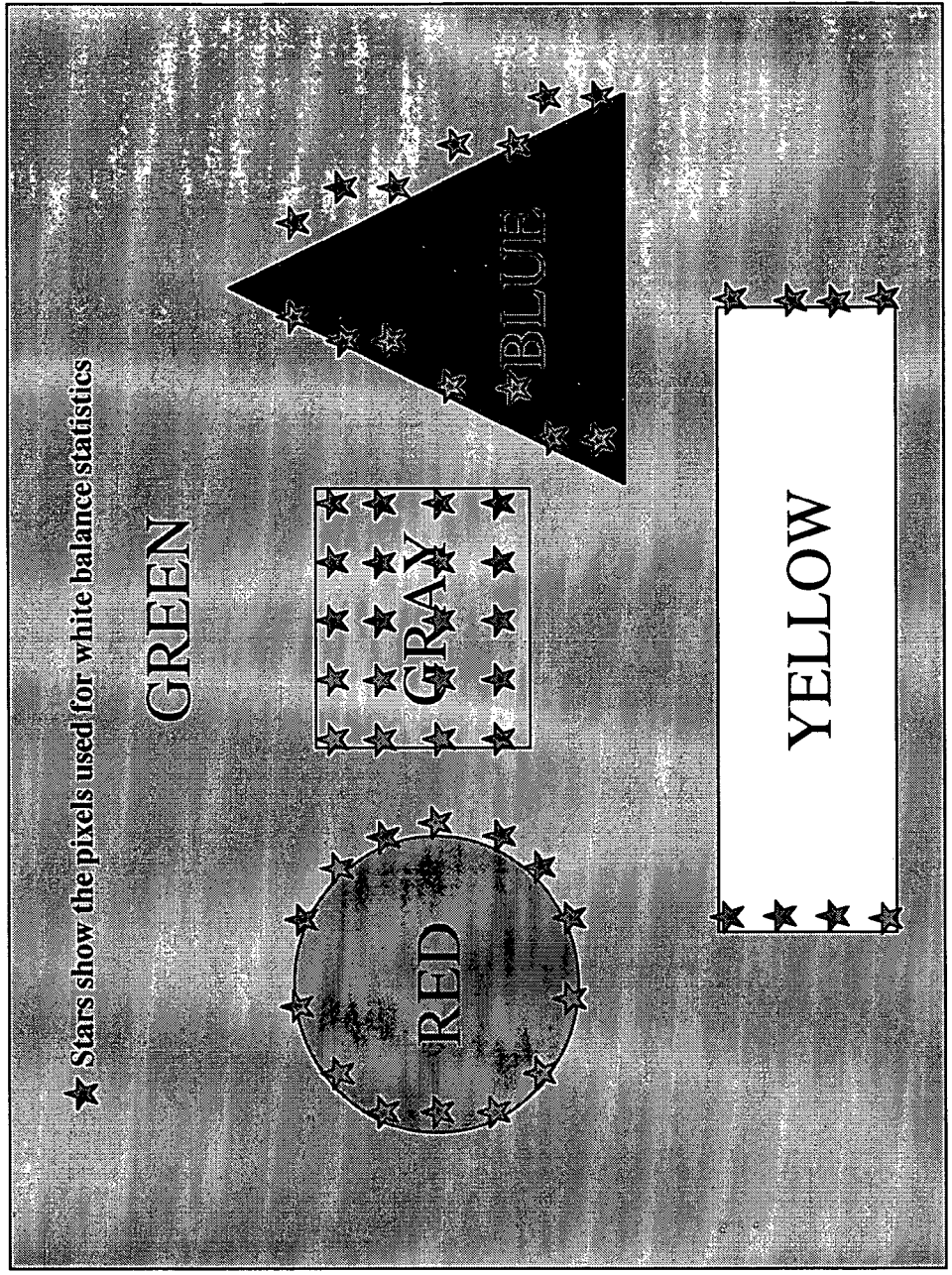
Figure 2. Illustration of Pixel Selection for White Balance Statistics According to the Method of Present Invention.

METHOD FOR ACCURATE REAL-TIME COMPENSATION FOR CHANGING ILLUMINATION SPECTRA IN DIGITAL VIDEO CAMERAS

CROSS REFERENCE TO RELATED APPLICATIONS

This application claims the benefit of U.S. Provisional Application Nos. 60/524,490 filed Nov. 21, 2003, 60/524,449 filed Nov. 21, 2003, 60/524,448 filed Nov. 21, 2003, and 60/524,488 filed Nov. 21, 2003, the contents of which are incorporated by reference herein.

Also incorporated by reference herein are the following applications which were filed on Jul. 14, 2004: Ser. Nos. 10/890,870, 10/890,911, 10/890,912, 10/890,913, 10/890,914 and 10/890,915.

Also incorporated by reference herein are the following applications filed on even date herewith:

| Title | Priority Application |
|---|---|
| HIGH RESOLUTION NETWORK VIDEO CAMERA WITH MASSIVELY PARALLEL IMPLEMENTATION OF IMAGE PROCESSING, COMPRESSION AND NETWORK SERVER | 60/524,449 |
| VIDEO SURVEILLANCE SYSTEM BASED ON HIGH RESOLUTION NETWORK CAMERAS CAPABLE OF CONCURRENT TRANSMISSION OF MULTIPLE IMAGE FORMATS AT VIDEO RATES | 60/524,448 |

BACKGROUND

One of the most intricate problems in on-camera color processing involves accurate compensation for changing spectra of scene illumination. This problem, also known as white balancing, stems from the fact that frequently occurring in practice illumination sources have significantly different spectral characteristics. In the absence of proper real-time compensation, the color of the imagery from video cameras would be changing with change in illumination spectra.

One of the strongest factors affecting spectral emission of most illuminators is its temperature. According to Plank's law, illuminators with higher temperature emit more energy at shorter wavelengths. From the point of view of imaging applications, hotter illuminators can be considered "blue", while colder sources can be considered "red". As a practical example, in the absence of compensation, images illuminated by the sunlight (blue-rich illuminator) appear bluish as compared to the images of the same scene being illuminated by the incandescent light.

Human brain, apparently, is capable of inferring the illumination spectra and performing the required compensation leading to the similar color perception of the same scene under wide range of illuminators. In the case of digital video cameras, proper color rendition can only be achieved if current spectra of illumination is determined and compensated for in real time. In practice this process can conceptually be broken into two distinct steps: gathering appropriate image statistics to estimate the spectra of illumination and performing the appropriate adjustment of color channel gains and/or color correction matrix applied to the image.

The difficulty in estimating the effects of illumination on the image color from the analysis of the image itself stems from the need to distinguish between overall color shift of the image that is due to specific illumination and that due to the presence of large monochrome objects. For example, accurate white balance algorithm needs to determine whether the image is bluish due to sunlight illumination or due to the presence of large blue-colored objects in the scene, wherein sunlight illumination requires the compensation, while no additional compensation is necessary in the later case.

Perhaps the simplest practical scheme for estimating the adjustment necessary to compensate for the effects of changing spectra of illumination is known as "gray world" model. Under "gray world" model it is assumed that in properly balanced image average values of red, green and blue components should be equal to each other due to the wide variety of colors present in "typical" scenes. It is assumed that color shift introduced by the specific spectra of scene illumination will be compensated once averages of all color components of the image are equalized by adjusting color channel gains of the camera.

While "gray world" approach works reasonably well for certain images, it fails for images dominated by monochrome objects, such as green grass or blue sky. There exist somewhat more sophisticated white balance algorithms that attempt to circumvent this problem by restricting statistics gathering only to pixels and areas of the image that are "close" to being gray or have small chrominance values. However, even that approach fails to produce proper white balance under many conditions. For example, if blue object in the image previously white balanced for sunlight is illuminated by red-rich incandescent light, then that blue object will appear grey, having small magnitudes of chrominance values and, therefore, will incorrectly contribute to the white balance statistics.

BRIEF DESCRIPTION OF DRAWINGS

FIG. 1 depicts flow-chart of the method disclosed in the present invention.

FIG. 2 depicts an illustration of pixel selection for white balance statistics according to the method of present invention.

SUMMARY

The subject of the present invention is the computationally simple easily amenable to hardware implementation method of gathering white balance statistics that allows to compute an accurate correction for the spectra of illumination even in the presence of large monochrome objects in the scene.

In the preferred embodiment of the present invention the disclosed method attempts to distinguish between two major factors affecting overall color statistics of the image: presence of large monochrome objects and specific spectra of illumination. A premise of the method of the present invention is that an illumination of the scene has an effect on color of all objects, wherein the presence of large monochrome objects in the image strongly contributes to the average image color statistics without affecting the colors of other scene objects. It is therefore desirable to eliminate from the white balance statistics pixels corresponding to large monochrome objects in the scene. In the preferred embodiment of the present invention average image colors are obtained by considering only those image pixels that have significantly different color from any of its neighboring pixels. The disclosed approach results in selection of only those pixels that lay on the boundaries of monochrome image segments, while avoiding their inner areas. Therefore, the white balance method disclosed in the present invention is not only tolerant to the presence of large non-gray monochrome areas in the image, but also avoids the image areas that have small chrominance values and appear to be gray due to specific illumination spectra, while not actually corresponding to the grey areas of the scene. FIG. 1 depicts flow-chart of the method disclosed in the present invention.

In the preferred embodiment of the present invention white balancing is performed continuously at regular frame count intervals and two distinct modes of white balance correction are considered: coarse and fine, where coarse mode is triggered by significant changes in illumination spectra, while fine mode is used to track small illumination changes when image is already well white balanced. During the fine stage, once the coarse white balance is achieved, the method disclosed in the present invention calls for inclusion of near-gray pixels in the white balance statistics, as the likelihood of erroneous selection of pixels that do not correspond to gray areas of the scene but appear gray due to specific illumination spectra has been diminished by the initial white balancing.

DETAILED DESCRIPTION

The subject of the present invention is the method of real-time analysis of color content of the video images that allows determining an accurate correction for the spectra of scene illumination even in the presence of large monochrome objects in the scene.

In the preferred embodiment of the present invention average image colors are obtained by considering only those image pixels that have significantly different color components from any of its neighboring pixels. The method disclosed in the present invention results in selection of only those pixels that lay on the boundaries of monochrome image areas, while avoiding inner pixels of said monochrome areas. Therefore, the white balance method disclosed in the present invention is not only tolerant to the presence of large non-gray monochrome areas in the image, but also avoids the image areas that have small chrominance values and appear to be gray due to specific illumination spectra, while not actually corresponding to the grey areas of the scene.

To achieve largely scene-independent coarse (initial) white balance, at the beginning of camera operation and at every significant change of image colors, only those pixels that are of significantly different color than their neighbor are considered. During the fine stage, once the coarse white balance is achieved, the method disclosed in the present invention calls for inclusion of near-gray pixels in the white balance statistics, as the likelihood of erroneous selection of pixels that do not correspond to gray areas of the scene but appear gray due to specific illumination spectra has been diminished by the initial white balancing. FIG. 2 depicts an illustration of pixel selection for white balance statistics according to the method of present invention.

Once the sums of color components of selected pixels are obtained in accordance with the method disclosed in the present invention, new color channel gains for red and blue channels are computed so as to bring the average color of selected pixels to gray while preserving the average luminance of the image. Specifically, the color channels gains are computed as:

(Eq. 1)

new_red_gain=Y*old_red_gain/red_sum and
new_blue_gain=Y*old_blue_gain/blue_sum,
where is the average luminance of the image:
Y=0.299*red_sum+0.587*green_sum+0.114*blue_sum In the preferred embodiment of the present invention every n-th pixel along every m-th line of the image is evaluated to determine if it should be included in the white balance statistics, where practical values of m and n depend on the imager resolution and are selected as to provide sufficiently large set of samples while keeping the task computationally light for high resolution video systems. As an example, the experiment shows that sampling every 16-th pixel of every 16-th line of the image works well for 1600×1200 camera.

To distinguish between the initial (coarse) and fine stage of white balancing, the method of the present invention requires the evaluation of the average image color based on accumulated statistics. If average image color is close to gray, then near-gray pixels, regardless of color, are included in the white balance statistics.

In the preferred embodiment the average image color is defined as being close to gray if the following condition is satisfied:

(Eq. 2)

Max(red_sum, green_sum, blue_sum)−Min(red_sum, green_ sum, blue_sum)<Min(red_sum, green_sum, blue_ sum)/M, where typical values of M are between 2 and 8;

In the preferred embodiment of the present invention the image pixels are sequentially evaluated along the scan direction (e.g. along an image line), wherein only those pixels are included in the white balance statistics that correspond to abrupt significant changes in image color as compared with the color of the previously evaluated pixel.

In another embodiment of the present invention image pixels are determined to correspond to significant changes in image color and are included in the white balance statistics if their colors are significantly different from the color of some of the neighboring them pixels.

In the preferred embodiment of the present invention, to determine if the pixel is significantly different in color from previously evaluated pixel, red, green and blue components of the pixel are first ordered to determine max_color, mid_color and min_color, where max_color is the color with the highest numerical value, min_color is the color with lowest value and mid_color has the intermediate value. Once max_color and min_color are determined, two variables, max_index and min_index, specifying actual colors that correspond to max_color and min_color are assigned values. For example, if max_color is red, then max_index=1, if max_color is green then max_color=2, etc. . . . .

In the preferred embodiment of the present invention, to minimize pixel noise and saturation effects on the white balance statistics, only those pixels that have max_color that is neither too small nor too high are selected. Consequently, for the pixel to be included in white balance statistics, its max_color is require to be between high, th_high, and low, th_low, thresholds, where practical values for th_high is approx. 90% of full range of possible color values (adc range) and 10% of full range for th_low. To signify out-of-range pixels, their color order may be set to an invalid value (0 in the above example).

In another embodiment of the present invention only those pixels that are neither too dark nor too bright are considered. Consequently, its luminance is required to be between high, luma_th_high, and low, luma_th_low, thresholds.

The n-th evaluated pixel is considered to be significantly different in color from (n−1)-th evaluated pixel if both n-th and (n−1)-th pixels lie in the specified brightness range, have different maximum and/or minimum colors and the color components that have different order are themselves differ significantly from each other. One of the multitudes of equivalent ways to accomplish this determination is given below:

For k-th pixel define (arbitrarily):
    If max_color(k)>th_high or max_color(k)<th_low then
        max_index(k)=0
    Else if max_index(k)=red(k) then
        max_index(k)=1
    Else if max_index(k)=green(k) then
        max_index(k)=2
    Else max_index(k)=3
    End if;

Similarly define:
    If min_index(k)=red(k) then
        min_index(k)=1
    Else if min_index(k)=green(k) then
        min_index(k)=2
    Else min_index(k)=3
    End if;

Further define:
    (Eq. 3)
    If (max_index(k)>0) and (max_index(k−1)>0) then
        If max_index(k)≠max_index(k−1) then
            If max_index(k)=min_index(k−1) then
                Delta1(k)=max_color(k)−min_color(k);
                Delta2(k)=max_color(k−1)−min_color(k−1);
            Else
                Delta1(k)=max_color(k)−mid_color(k);
                Delta2(k)=max_color(k−1)−mid_color(k−1);
            End if;
        Else if min_index(k)≠min_index(k−1) then
            Delta1(k)=mid_color(k)−min_color(k);
            Delta2(k)=mid_color(k−1)−min_color(k−1);
        Else
            Delta1(k)=0;
            Delta2(k)=0;
        End if;
    Else
        Delta1(k)=0;
        Delta2(k)=0;
    End if;

The pixel pair (k, k−1) is defined to be of significantly different color and is included in white balance statistics if at least one of the following two conditions is satisfied:
(Eq. 4)

Delta1(k)>(max_color(k)−min_color(k))/N or

Delta2(k)>(max_color(k−1)−min_color(k−1))/N, where practical values of N are between 2 and 8;

In the preferred embodiment, once the condition given by Eq. 2 is satisfied, it is assumed that the initial white balancing has been achieved and that the image colors are no longer significantly "distorted" by the illumination spectra, wherein to achieve more accurate white balance and to improve the stability of the present method, the pixels that are "almost" gray are also included in the white balance statistics.

In another embodiment of the present invention, the initial coarse white balance is considered to have been achieved if the number of pixels satisfying Eq. 4 is large (e.g. more than 10% of all sampled pixels). This later embodiment is based on the fact that in an improperly white balanced image all pixel colors are shifted towards one color and have one color component significantly higher or lower than other color components, wherein making pixel colors less distinct.

In yet another embodiment of the present invention, the initial coarse white balance is considered to have been achieved if the number of pixels whose maximum color components are significantly different from each other is large (e.g. more than 10% of all sampled pixels).

In the preferred embodiment,
(Eq. 5)
If Eq. 2 is satisfied and for k-th pixel
max_color(k)−min_color(k)<min_color(k)/M,
where practical values of M are between 2 and 8, then the pixel is included in white balance statistics as being "almost" gray.

In another embodiment of the present invention the pixel is considered "almost gray" if its maximum chrominance component is small as compared to that pixel luminance:
If Eq. 2 is satisfied and for k-th pixel
(Eq. 6)
Max{abs(Cr(k)),abs(Cb(k))}<Y(k)/M,
Y(k)=0.299*red(k)+0.587*green(k)+0.114*blue(k)
Cr(k)=red(k)−Y(k); Cb(k)=blue(k)−Y(k);
where practical values of M are between 2 and 8, then the pixel is included in white balance statistics as being "almost" gray.

In the preferred embodiment of the present invention, red and blue channel gains calculated according to Eq. 1 are not directly applied to the camera imagery, but rather time averaged to eliminate the effects of small illumination fluctuations on the overall white balance. In the preferred embodiment this averaging is performed as:
(Eq. 7)
gain_avg=((T−1)/T)*gain_avg+(1/T)*new_gain, where value of T determines the "speed" of white balance response to changing scene conditions.

What is claimed as new and desired to be protected by Letters of Patent of the United States is:

1. A method of determining a correction for a spectra of scene illumination based on analysis of color content of a video image, the method comprising:
    electronically considering two pixels at a time to determine pairs of neighboring image pixels that substantially differ in color from each other;
    electronically evaluating overall sums of color components of the image by adding values of each color component of the pixels of said pixel pairs;
    electronically determining an average image luminance by adding together luminance values of the pixels of said pixel pairs;
    electronically computing gain adjustments for said color components of the image in a manner that said sums of color components of the image are equalized and said average image luminance does not change; and
    electronically applying said computed gain adjustments to said color components of all image pixels, wherein
    said electronically determining is performed by sequentially inspecting pixel pairs along a scan direction of the image, wherein only pixel pairs comprising pixels of the same image line and having N pixels between them are considered for determining pairs of neighboring image pixels, and wherein N is an integer value from 0 to a length of an image line minus two.

2. The method of claim 1, wherein k-th pixel having color components red(k), green(k) and blue(k) and (k−1)-th pixel having color components red(k−1), green(k−1) and blue(k−1) significantly differ in color if
Delta1(k)>(max_color(k)−min_color(k))/N
or
Delta2(k)>(max_color(k−1)−min_color(k−1))/N,
where max_color is the color with highest numerical value, min_color is the color with lowest numerical value and mid_color the color with an intermediate value for a respective pixel, wherein N is an integer value from 2 to 8 and wherein Delta1(k) and Delta2(k) are defined as follow:

If max_index(k)≠max_index(k−1) then
   If max_index(k)=min_index(k−1) then
      Delta1(k)=max_color(k)−min_color(k);
      Delta2(k)=max_color(k−1)−min_color(k−1);
   Else
      Delta1(k)=max_color(k)−mid_color(k);
      Delta2(k)=max_color(k−1)−mid_color(k−1);
   End if;
Else if min_index(k)≠min_index(k−1) then
      Delta1(k)=mid_color(k)−min_color(k);
      Delta2(k)=mid_color(k−1)−min_color(k−1);
   Else
      Delta1(k)=0;
      Delta2(k)=0;
   End if;
where max_index and min_index are values for actual colors that correspond to max_color and min_color, respectively, wherein If min_index(k)=red(k) then
   min_index(k)=1
Else if min_index(k)=green(k) then
   min_index(k)=2
Else min_index(k)=3
End if,
and wherein
if max_index(k)=red(k) then
   max_index(k)=1
Else if max_index(k)=green(k) then
   max_index(k)=2
Else max_index(k)=3
End if.

3. A method of determining a correction for a spectra of scene illumination based on analysis of color content of a video image, the method comprising:

electronically considering two pixels at a time to determine pairs of neighboring image pixels that substantially differ in color from each other;

electronically evaluating overall sums of color components of the image by adding values of each color component of the pixels of said pixel pairs;

electronically determining an average image luminance by adding together luminance values of the pixels of said pixel pairs;

electronically computing gain adjustments for said color components of the image in a manner that said sums of color components of the image are equalized and said average image luminance does not change; and electronically applying said computed gain adjustments to said color components of all image pixels, wherein said computing gain adjustments adjusting comprises the steps of:

computing ratios of blue and red color gains currently applied to the image to sums of blue and red color components of the image; and obtaining new color gains by multiplying said ratios by a value of said image luminance.

4. The method of claim 3, wherein said color gains are applied to the image by gradual transition over many image frames from previously applied color gains.

5. A method of determining a correction for a spectra of scene illumination based on analysis of color content of a video image, the method comprising:

electronically considering two pixels at a time to determine pairs of neighboring image pixels that substantially differ in color from each other;

electronically identifying substantially gray image pixels, wherein each of said pixels having red, green and blue components of similar magnitude;

electronically evaluating overall sums of color components of the image by adding values of each color component of pixels of said pixel pairs and values of each color component of all said substantially gray pixels;

electronically determining image luminance by adding together luminance values of the pixels of said pixel pairs and luminance values of all said substantially gray pixels;

electronically computing gain adjustments for said color components of the image in a manner that said sums of color components of the image are equalized and said average image luminance does not change; and electronically applying said computed gain adjustments to said color components of all image pixels, wherein said electronically identifying of said substantially gray pixels and said adding of values of said substantially gray pixels are performed only when the image colors have been determined to be substantially balanced.

6. The method of claim 5, wherein said image colors are determined to be substantially balanced if said determining of pixel pairs resulted in a large number of determined pairs based on experimental values for particular video equipment.

7. The method of claim 5, wherein said image colors are determined to be substantially balanced if said overall sums of color components of said image are substantially equal to each other.

8. The method of claim 5, wherein said determining is performed by sequentially inspecting pixel pairs along a scan direction of the image, and wherein only pixel pairs comprising pixels of a same image line are considered for determining pairs of neighboring image pixels.

9. The method of claim 5, wherein said determining is performed by sequentially inspecting pixel pairs along a scan direction of the image, and wherein only pixel pairs comprising pixels of a same image line and having N pixels between them are considered, wherein N is an integer value from 0 to a length of an image line minus two.

10. The method of claim 5, wherein k-th pixel having color components red(k), green(k) and blue(k) and (k−1)-th pixel having color components red(k−1), green(k−1) and blue(k−1) significantly differ in color if Delta1(k)>(max_color(k)−min_color(k))/N
or
Delta2(k)>(max_color(k−1)−min_color(k−1))/N, where max_color is the color with highest numerical value, min_color is the color with lowest numerical value and mid_color the color with an intermediate value for a respective pixel, wherein N is an integer value from 2 to 8 and wherein Delta1(k) and Delta2(k) are defined as follow:

If max_index(k)≠max_index(k−1) then
   If max_index(k)=min_index(k−1) then
      Delta1(k)=max_color(k)−min_color(k);
      Delta2(k)=max_color(k−1)−min_color(k−1);
   Else
      Delta1(k)=max_color(k)−mid_color(k);
      Delta2(k)=max_color(k−1)−mid_color(k−1);
   End if,
Else if min_index(k)≠min_index(k−1) then
   Delta1(k)=mid_color(k)−min_color(k);
   Delta2(k)=mid_color(k−1)−min_color(k−1);

```
Else
    Delta1(k)=0;
    Delta2(k)=0;
End if,
```
where max_index and min_index are values for actual colors that correspond to max_color and min_color, respectively, wherein
```
If min_index(k)=red(k) then
    min_index(k)=1
Else if min_index(k)=green(k) then
    min_index(k)=2
Else min_index(k)=3
End if,
```
and wherein
```
if max_index(k)=red(k) then
    max_index(k)=1
Else if max_index(k)=green(k) then
    max_index(k)=2
Else max_index(k)=3
End if.
```

11. A method of determining a correction for a spectra of scene illumination based on analysis of color content of a video image, the method comprising:

electronically considering two pixels at a time to determine pairs of neighboring image pixels that substantially differ in color from each other;

electronically identifying substantially gray image pixels, wherein each of said pixels having red, green and blue components of similar magnitude;

electronically evaluating overall sums of color components of the image by adding values of each color component of pixels of said pixel pairs and values of each color component of all said substantially gray pixels;

electronically determining image luminance by adding together luminance values of the pixels of said pixel pairs and luminance values of all said substantially gray pixels;

electronically computing gain adjustments for said color components of the image in a manner that said sums of color components of the image are equalized and said average image luminance does not change; and electronically applying said computed gain adjustments to said color components of all image pixels, wherein said electronically computing gain adjustments comprises the steps of:

electronically computing ratios of blue and red color gains currently applied to the image to sums of blue and red color components of the image; and obtaining new color gains by multiplying said ratios by a value of said image luminance.

12. The method of claim 11, wherein said color gains are electronically applied to the image by gradual transition over many image frames from previously applied color gains.

* * * * *